United States Patent
Juigne et al.

(10) Patent No.: US 10,760,501 B2
(45) Date of Patent: Sep. 1, 2020

(54) ARM FOR TURBINE-ENGINE CASING COMPRISING A REMOVABLE ADDITIONAL PIECE

(71) Applicant: SAFRAN AIRCRAFT ENGINES, Paris (FR)

(72) Inventors: Sebastien Nicolas Juigne, Saint Pierre du Perray (FR); Kevin Michael Robert Contal, Saint Pierre du Perray (FR); Mathieu Gaillot, Paris (FR); Francois Marie Paul Marlin, Villiers sous Grez (FR); Steve Marcel Nicaise, La Varenne Saint-Hilaire (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 105 days.

(21) Appl. No.: 16/097,030

(22) PCT Filed: Apr. 27, 2017

(86) PCT No.: PCT/FR2017/050998
§ 371 (c)(1),
(2) Date: Oct. 26, 2018

(87) PCT Pub. No.: WO2017/187091
PCT Pub. Date: Nov. 2, 2017

(65) Prior Publication Data
US 2019/0136715 A1    May 9, 2019

(30) Foreign Application Priority Data
Apr. 28, 2016  (FR) .................................... 16 53827

(51) Int. Cl.
*F02C 7/36*    (2006.01)
*F02C 7/32*    (2006.01)
*F01D 15/12*   (2006.01)

(52) U.S. Cl.
CPC ................. *F02C 7/36* (2013.01); *F02C 7/32* (2013.01); *F01D 15/12* (2013.01); *F05D 2230/70* (2013.01); *F05D 2240/14* (2013.01)

(58) Field of Classification Search
CPC .... F02C 7/32; F02C 7/36; F01D 15/12; F01D 25/16; F01D 25/162; F01D 9/06; F01D 9/065; F05D 2230/70; F05D 2240/14
See application file for complete search history.

(56) References Cited

U.S. PATENT DOCUMENTS

| | | | | |
|---|---|---|---|---|
| 4,566,269 A | * | 1/1986 | Gingras | .................... F02C 7/32 60/226.1 |
| 2013/0319140 A1 | | 12/2013 | Brault et al. | |

(Continued)

FOREIGN PATENT DOCUMENTS

| WO | WO 2012/114029 A1 | 8/2012 |
|---|---|---|
| WO | WO 2013/004964 A1 | 1/2013 |
| WO | WO 2015/189522 A1 | 12/2015 |

OTHER PUBLICATIONS

International Search Report dated Oct. 11, 2017, in PCT/FR2017/050998, filed Apr. 27, 2017.

(Continued)

*Primary Examiner* — Richard A Edgar
(74) *Attorney, Agent, or Firm* — Oblon, McClelland, Maier & Neustadt, L.L.P.

(57) ABSTRACT

To facilitate the removal of a bearing housed in an arm of a turbomachine casing, which bearing guides a transmission shaft of the turbomachine, a casing arm includes a body with a vertical portion and a base defining a portion of a shaft housing; an additional part removably attached to the body and defining a bearing housing opening in the shaft housing; and a removable shim inserted between the base and the additional part. A turbomachine including such a casing arm is also described, as well as a method for removing the (Continued)

bearing from such a turbomachine, including removing the shim and moving the additional part towards the base, thereby allowing access to the bearing.

10 Claims, 5 Drawing Sheets

(56) References Cited

U.S. PATENT DOCUMENTS

2014/0135134 A1    5/2014   Duchatelle et al.
2017/0122122 A1    5/2017   Lepretre

OTHER PUBLICATIONS

Preliminary French Search Report dated Nov. 22, 2016, in FR 1653827, filed Apr. 28, 2016.

* cited by examiner

ARM FOR TURBINE-ENGINE CASING COMPRISING A REMOVABLE ADDITIONAL PIECE

TECHNICAL FIELD

The present invention relates to the field of turbine engines for aircraft, and relates more particularly to a casing arm intended to house a secondary transmission shaft, and a turbine engine comprising such a casing arm.

The invention also relates to a method for removing a bearing intended for guiding a transmission shaft of such a turbine engine.

PRIOR ART

In an aircraft turbine engine, a transmission shaft in general connects a rotor shaft of the turbine engine to auxiliary equipment such as a starter of the turbine engine.

The rotor shaft is a shaft centred on the axis of the turbine engine and connecting a compressor arranged upstream of a combustion chamber to a turbine arranged downstream of the combustion chamber, in a well known fashion.

The transmission shaft is sometimes composed of a primary transmission shaft and a secondary transmission shaft mounted end to end and coupled to one another at a bearing providing the guidance and centring of the transmission shaft.

The secondary transmission shaft is in general housed, optionally with other ancillaries, in an arm arranged in a blade ring for regulating a flow of air flowing in the turbine engine integrated in a casing, normally referred to as an "intermediate casing". The arm plays a structural role since it connects an external collar to a hub of the casing and thus participates in the mechanical cohesion of the whole of the intermediate casing.

However, the bearing of the transmission shaft needs regular maintenance operations that require this bearing to be dismantled.

However, removing this bearing requires removing the arm, which requires removing the turbine engine.

These operations thus prove to be complex, lengthy and therefore very expensive.

DISCLOSURE OF THE INVENTION

The aim of the invention is in particular to provide a simple, economical and effective solution to this problem.

To this end it proposes an arm for a turbine-engine casing having a first longitudinal end provided with first fixing means intended to be fixed to an external casing collar, and a second longitudinal end provided with second fixing means intended to be fixed to a casing hub, the arm comprising a shaft housing emerging at the first longitudinal end of the arm in order to house a secondary turbine-engine transmission shaft.

According to the invention, the arm comprises a body formed by a base and an upright. The base includes the first fixing means, and has a first portion, arranged on the same side as a first lateral end of the arm, and a second portion, arranged on the same side as a second lateral end of the arm opposite to the first lateral end and including a first section of the shaft housing. In addition, the upright has a first longitudinal end connected to the first portion of the base and a second longitudinal end opposite to the first longitudinal end and including part of the second fixing means. The arm further comprises an additional piece fixed removably to the body. The additional piece includes a first section of the shaft housing and delimits a bearing housing, emerging in the shaft housing and intended to house a bearing. The arm further comprises a spacer interposed between the base and the additional piece, and including a third section of the shaft housing. Finally, the upright and the additional piece are mutually in contact by means of contact surfaces conformed so as to allow a movement of the additional piece towards the base when the arm is devoid of the spacer.

Removing the additional piece thus makes it possible to access the bearing and therefore to perform maintenance operations on the bearing without having to dismantle the intermediate casing, and therefore without having to remove a turbine engine equipped with this intermediate casing.

To this end, a prior removal of the spacer makes it possible to move the additional piece towards the base of the body.

In a preferred embodiment of the invention, the contact surfaces are conformed so as to allow a movement of the additional piece along the upright towards the base parallel to an axis of the shaft housing, when the arm is devoid of the spacer.

To this end, the contact surfaces preferably extend parallel to the axis of the shaft housing. In a variant, these contact surfaces may be inclined.

The arms preferably have the features according to which:
- the contact surfaces comprise a first surface formed on the upright and a second surface formed on the additional piece and applied against the first surface,
- the upright comprises a fixing plate projecting beyond the first surface,
- the additional piece has a first recess emerging in the second surface, and in which the fixing plate is arranged,
- the first recess extends beyond the fixing plate in a direction of moving away from the base parallel to the axis of the shaft housing,
- the fixing plate comprises at least a first fixing orifice, the additional piece comprises at least a second fixing orifice,
- the arm further comprises at least a first fixing member conjointly passing through the first fixing orifice and the second fixing orifice.

Removal of the spacer thus enables the additional piece to be slid along the fixing plate towards the base.

In addition, the spacer preferably comprises:
- a third surface applied against the first surface,
- a second recess emerging in the third surface, and in which the fixing plate is arranged, and
- at least a third fixing orifice.

In this case, the fixing plate advantageously comprises at least a fourth fixing orifice facing the third fixing orifice, and the arm further comprises at least a second fixing member passing conjointly through the third fixing orifice and the fourth fixing orifice.

Furthermore, the arm preferably comprises an obturator arranged in the first recess alongside the fixing plate so as to close off a region of the recess situated beyond the fixing plate in the direction of moving away from the base.

The obturator provides continuity of an external surface of the arm at the first recess.

Preferably the fixing plate comprises a fourth fixing orifice and has a fourth surface, and the first recess has a bottom surface on which the first surface is applied.

Preferably, the additional piece comprises a fifth surface situated on a side opposite to a side of the second surface, and the base has a sixth surface situated in line with the fifth surface, the arm further comprising an interface plate having a seventh surface applied conjointly to the fifth and sixth surfaces and fixed to at least one of the fifth and sixth surfaces.

Such an interface plate allows fixing of a kit for the passage of ancillaries, which may be of a conventional type.

Moreover, the bearing housing preferably emerges in the second longitudinal end of the arm.

The invention also relates to a turbine engine for an aircraft, comprising:
- a rotor shaft connecting compressor blades to turbine blades,
- a secondary flow channel,
- a casing comprising a casing hub arranged radially towards the inside with respect to the secondary flow channel, and an external casing collar arranged radially towards the outside with respect to the secondary flow channel,
- a primary transmission shaft and a secondary transmission shaft arranged end to end and extending in a direction orthogonal or inclined with respect to the rotor shaft, and
- a bearing for guiding the primary and secondary transmission shafts, and wherein:
- the casing comprises an arm of the type described above, the first fixing means of which are fixed to the external casing, and the second fixing means of which are fixed to the casing hub,
- the primary transmission shaft has a radially internal end coupled to a rotor shaft, and a radially external end,
- the secondary transmission shaft has a radially internal end coupled to the radially external end of the primary transmission shaft at the bearing,
- the secondary transmission shaft is housed in the shaft housing of the arm, and
- the bearing is housed in the bearing housing of the arm.

Where applicable, an extent of the first recess beyond the fixing plate, and an extent of the spacer, in a direction parallel to the primary transmission shaft, are preferably greater than an uncoupling distance of the bearing and primary transmission shaft.

Thus a movement of the additional piece towards the base, parallel to the axis of the primary shaft, allows complete uncoupling of the bearing and primary transmission shaft. The operation of removing the bearing is thus particularly easy.

Finally, the invention relates to a method for removing the bearing of a turbine engine of the type described above, comprising the steps consisting of:
- removing the secondary transmission shaft from the first end of the arm,
- removing the spacer,
- removing the additional piece, then
- moving the additional piece towards the base of the body in a space previously occupied by the spacer, then
- uncoupling the bearing and primary transmission shaft.

Where applicable, the method may comprise a step consisting of removing the obturator prior to the step consisting of moving the additional piece towards the base.

Moreover, the method may comprise a step consisting of removing the interface plate previously fixed to the base of the body and to the additional piece so as to sandwich the additional piece with the upright.

BRIEF DESCRIPTION OF THE DRAWINGS

The invention will be understood better, and other details, advantages and features thereof will emerge from a reading of the following description given by way of non-limitative example and with reference to the accompanying drawings, in which.

In all these figures, identical references may designate identical or similar elements.

DETAILED DISCLOSURE OF A PREFERRED EMBODIMENT

Figure 1:
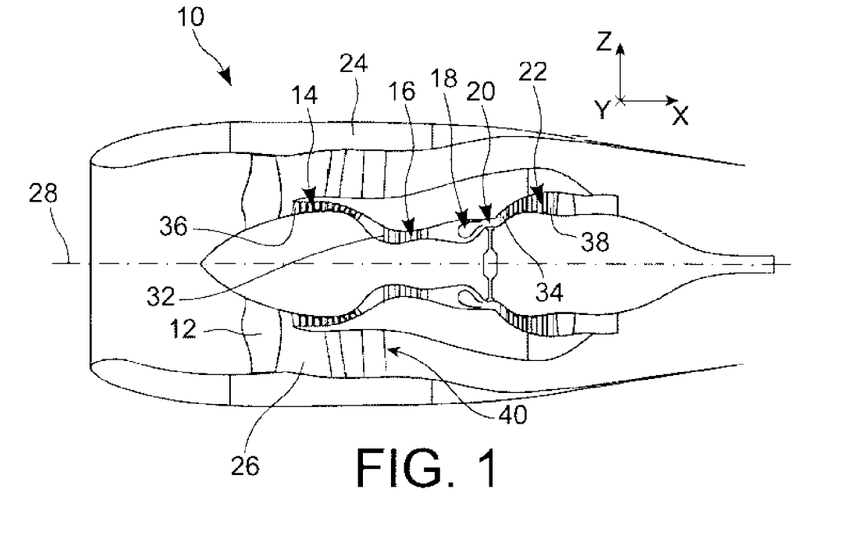
FIG. 1 is a schematic view in axial section of a turbine engine for an aircraft of a known type.

FIG. 1 illustrates a turbine engine 10 for an aircraft of a known type, for example a twin-spool bypass turbine engine, comprising in general terms a fan 12 intended for aspirating an airflow dividing downstream of the fan into a primary flow supplying a core of the turbine engine and a secondary flow bypassing this core. The core of the turbine engine comprises, in general terms, a low-pressure compressor 14, a high-pressure compressor 16, a combustion chamber 18, a high-pressure turbine 20 and a low-pressure turbine 22. The turbine engine is faired by a nacelle 24 surrounding the secondary flow channel 26. The rotors of the turbine engine are mounted so as to rotate about a longitudinal axis 28 of the turbine engine.

In the whole of this description, the axial direction X is the direction of the longitudinal axis 28 of the turbine engine, the vertical direction Z is a direction orthogonal to the axial direction X and oriented along the vertical when the turbine engine equips an aircraft stationary on the ground, and the transverse direction Y is orthogonal to the previous two directions. Moreover, the radial direction is defined by reference to the axis 28, while the "upstream" and "downstream" directions are defined with reference to the general flow of the gases in the turbine engine.

As is well known, the high-pressure compressor 16 and the high-pressure turbine 20 comprise movable blades 32, 34 connected by means of the motor shaft, normally referred to as the "high-pressure shaft". In a similar manner, the low-pressure compressor 14 and the low-pressure turbine 22 comprise movable blades 36, 38 connected by means of another rotor shaft, normally referred to as the "low-pressure shaft" and extending inside the high-pressure shaft.

Figure 2:
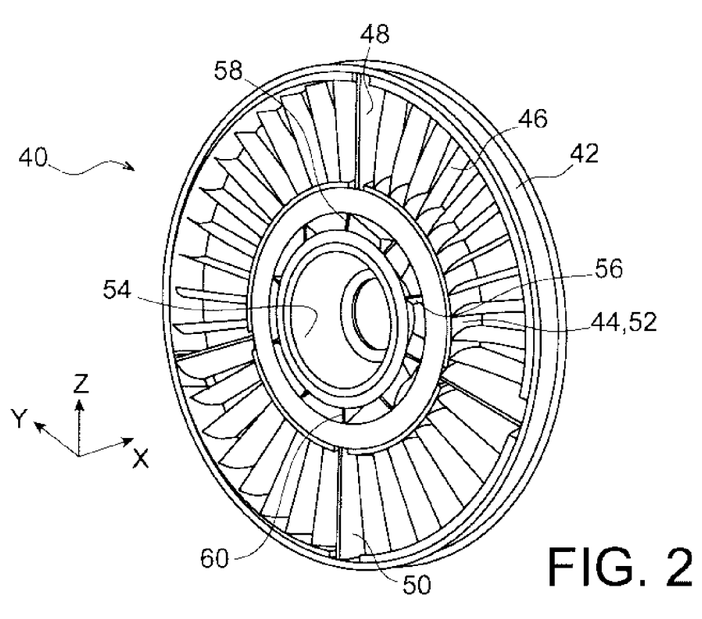
FIG. 2 is a schematic perspective view of a casing of the turbine engine in FIG. 1, isolated from the rest of the turbine engine.

The turbine engine comprises an intermediate casing 40 arranged axially between the low-pressure compressor 14 and the high-pressure compressor 16, and shown in isolation in FIG. 2.

This intermediate casing 40 comprises an external casing collar 42, a casing hub 44, diverting blades 46 extending from the external collar 42 as far as the hub 44, and two arms 48 and 50 connecting the external collar 42 to the hub 44 and playing a structural role. The external collar 42 extends around the secondary flow channel 26, while the hub 44 extends radially inside this channel 26. The hub 44 includes an external annular hub wall 52, an internal annular hub wall 54, other diverter blades 56 and other arms 58, 60 connecting the external annular hub wall 52 to the internal annular hub wall 54.

Figure 3:
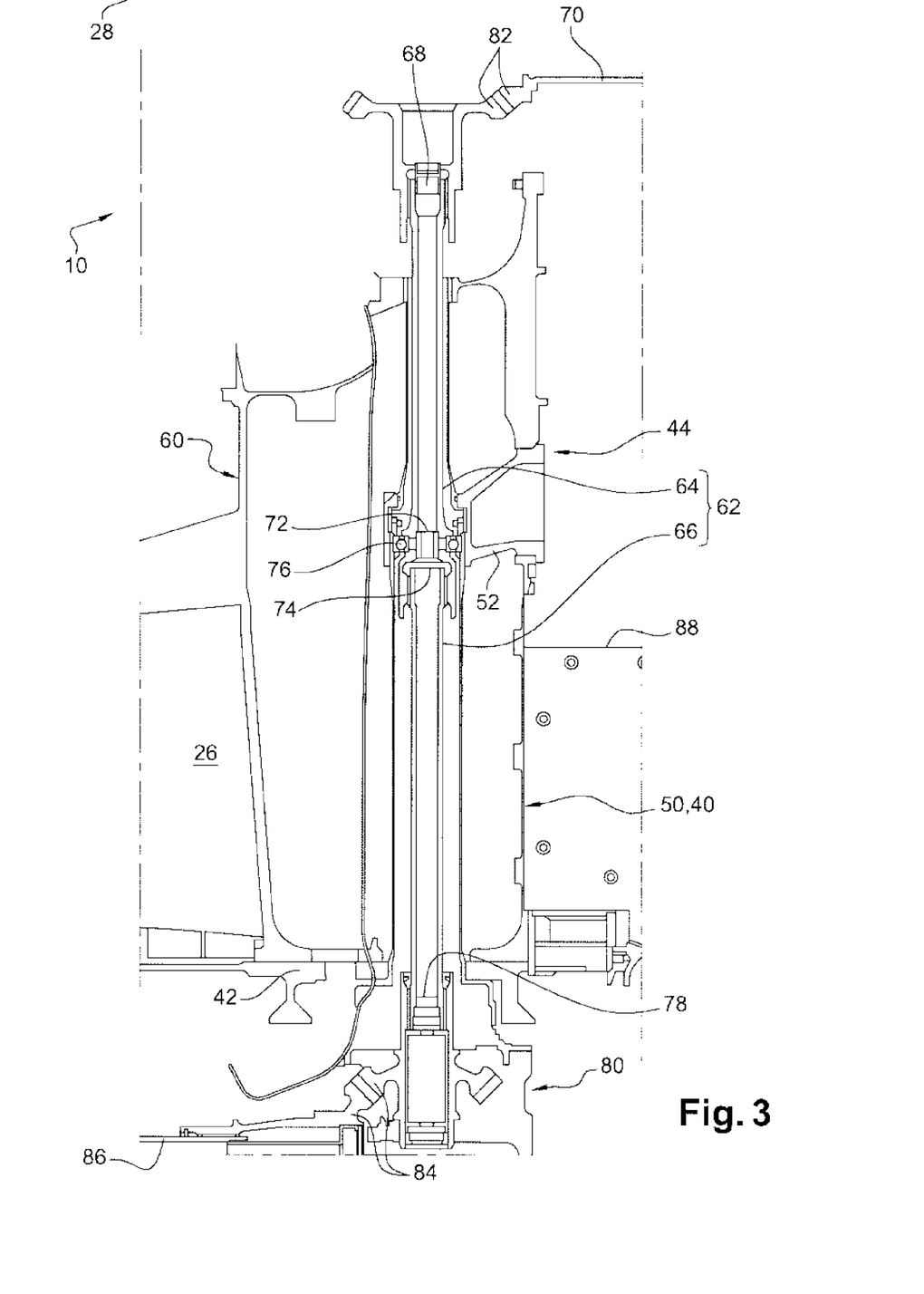
FIG. 3 is a partial schematic half-view in axial section and to a larger scale of the turbine engine in FIG. 1, illustrating the casing in FIG. 2.

The arms 50 and 60 situated in a low position, that is to say at "six o'clock", are used for the passage of a transmission shaft 62 visible in FIG. 3, and may furthermore house other ancillaries.

The transmission shaft 62 is a shaft in two parts mounted end to end, namely a radially internal part, referred to as the "primary transmission shaft 64", with a radially external part, referred to as the "secondary transmission shaft 66".

In general terms, the transmission shaft 62 is designed to transmit a rotation movement between one of the rotor shafts, in general the high-pressure shaft in the case of a twin-spool turbine engine, and a gearbox ("accessory gearbox" or "AGB") connected to auxiliary equipment such as a starter of the turbine engine.

As shown in FIG. 3, the primary transmission shaft 64 has a radially internal end 68 coupled to the high-pressure shaft 70, and a radially external end 72, and the secondary transmission shaft 66 has a radially internal end 74 coupled to the radially external end 72 of the primary transmission shaft 64 at a bearing 76 that thus provides the guidance and centring of the transmission shat 62, and a radially external end 78 that is for example coupled to an angle transfer box 80 sometimes referred to as a TGB ("transfer gearbox") itself connected to the accessory gearbox AGB. The coupling of the radially internal end 68 to the high-pressure shaft 70 is for example done by means of a pair of bevel gears 82. The transfer gearbox 80 also comprises a pair of bevel gears 84 connecting the secondary shaft 66 to a transfer shaft 86 itself connected to the accessory box AGB.

In the example illustrated, the primary 64 and secondary 66 transmission shafts extend orthogonally to the axis 28 of the turbine engine and therefore to the rotor shafts thereof. In a variant, the shafts 64 and 66 may extend in a direction inclined with respect to the axis 28.

In addition, a kit for the passage of ancillaries 88, sometimes referred to as the "engine kit", is fixed to the downstream side of the arm 50.

FIGS. 4 to 10 relate to a turbine engine 10 according to a preferred embodiment of the invention, which is overall similar to the turbine engine of FIGS. 1 to 3 but which is distinguished therefrom by the configuration of the arm 50, which houses the secondary transmission shaft 66.

Figure 4:
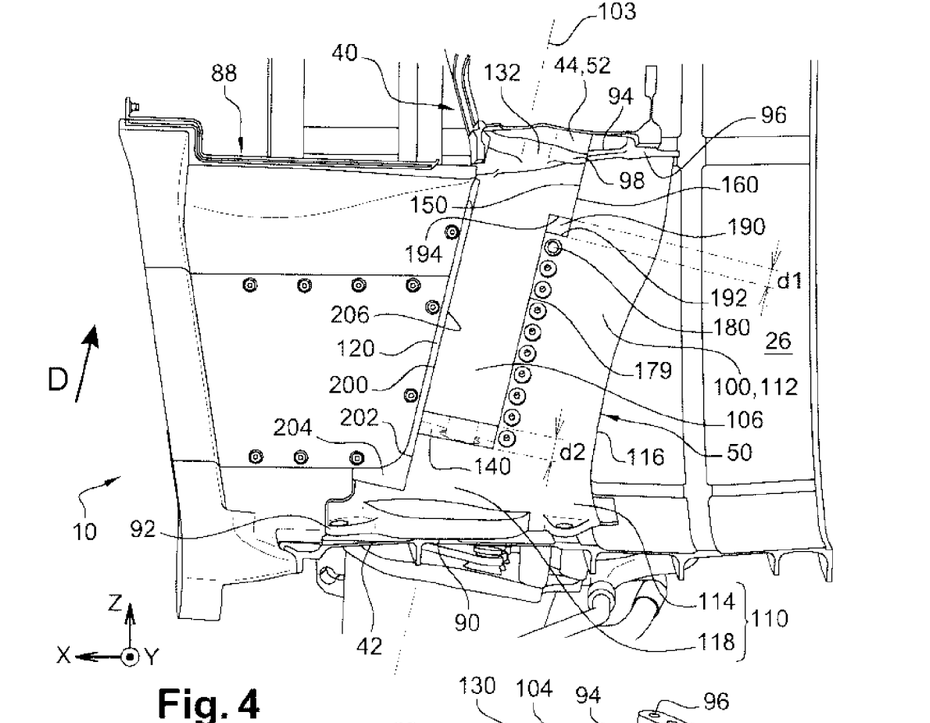
FIG. 4 is a partial schematic view in axial section of a turbine engine according to a preferred embodiment of the invention, illustrating in particular a casing arm housing a secondary transmission shaft.

FIG. 4 shows the arm 50 in the intermediate casing 40, while FIGS. 5 to 10 illustrate this arm 50 and its constituents taken in isolation.

In the remainder of the present description, the direction "longitudinal" is defined with reference to the arm 50, and therefore corresponds to a radial direction of the turbine engine defined by reference to the axis 28. The "lateral" direction is a direction orthogonal to the longitudinal direction of the arm, and corresponds to the direction of the axis 28.

The arm 50 has a first longitudinal end 90 provided with first fixing means 92 (FIG. 5) that enable the arm 50 to be fixed to the external collar 42 of the intermediate casing 40 (FIG. 4). The arm 50 has a second longitudinal end 94 provided with second fixing means 96, 98 (FIG. 5), which allow fixing of the arm 50 to the hub 44 of the intermediate casing 40 (FIG. 4), In general terms, the arm 50 comprises a body 100 that delimits at least part of a shaft housing 102 emerging in the first longitudinal end 90 of the arm and intended for the secondary transmission shaft 66 to pass. The shaft housing 102 is centred on an axis 103 (FIG. 4) that coincides with an axis of the secondary transmission shaft 66 when the latter is housed in the shaft housing 102. The arm 50 also comprises a bearing housing 104 emerging in the shaft housing 102 on one side and emerging at the second longitudinal end 94 of the arm on the other side. This bearing housing 104 is intended to house the bearing 76. The arm further comprises an additional piece 106 fixed removably to the body 100 and delimiting the bearing housing 104, as will be clearer hereinafter.

Figure 5:
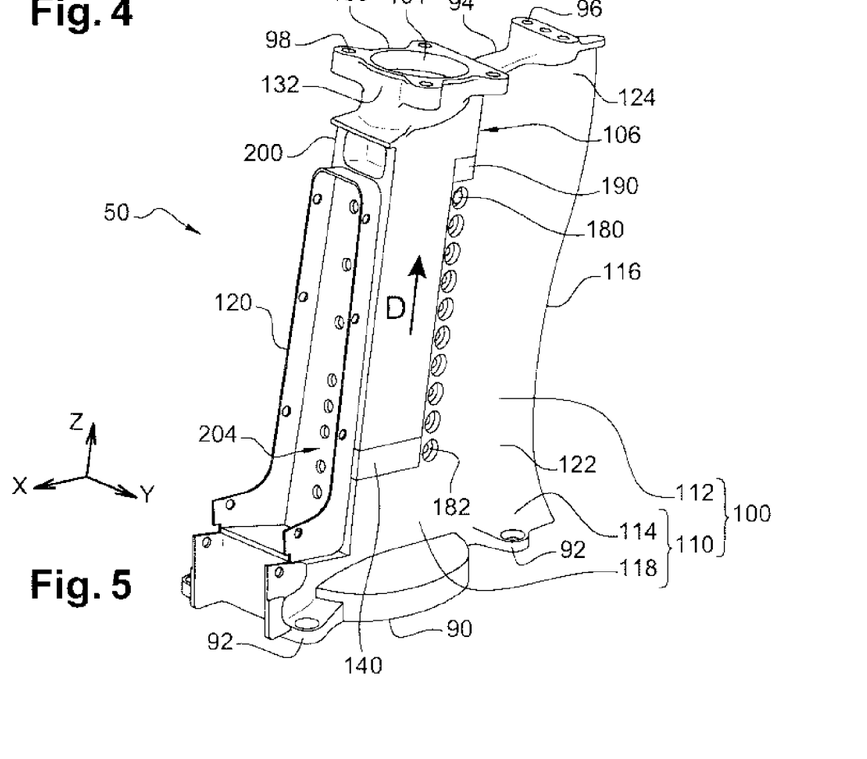
FIG. 5 is a schematic view in perspective of the arm of the turbine engine in FIG. 4, isolated from the rest of the turbine engine.
Figure 6:
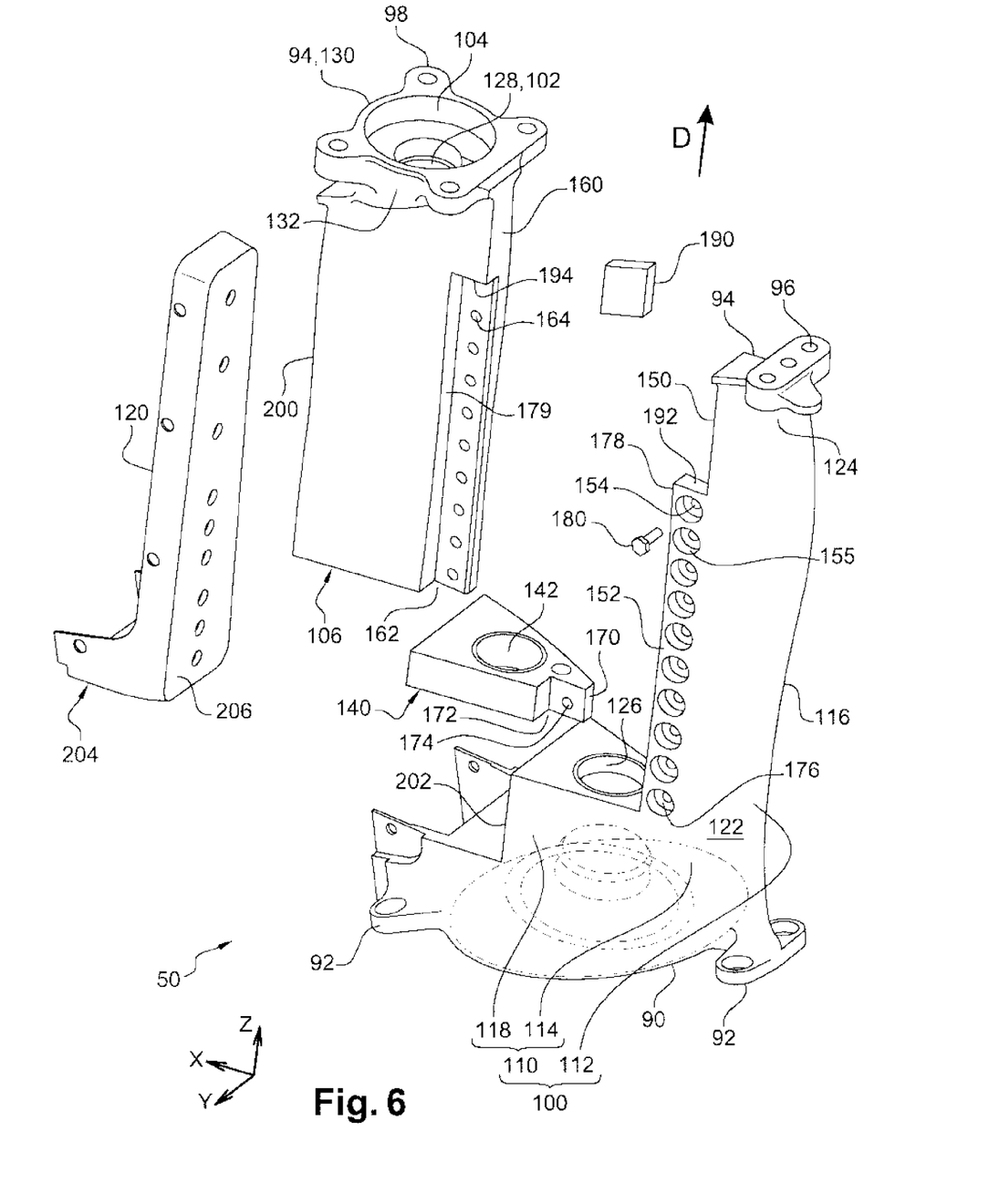
FIG. 6 is a schematic view in exploded perspective of the arm in FIG. 5.
Figures 7, 8, 9, 10:
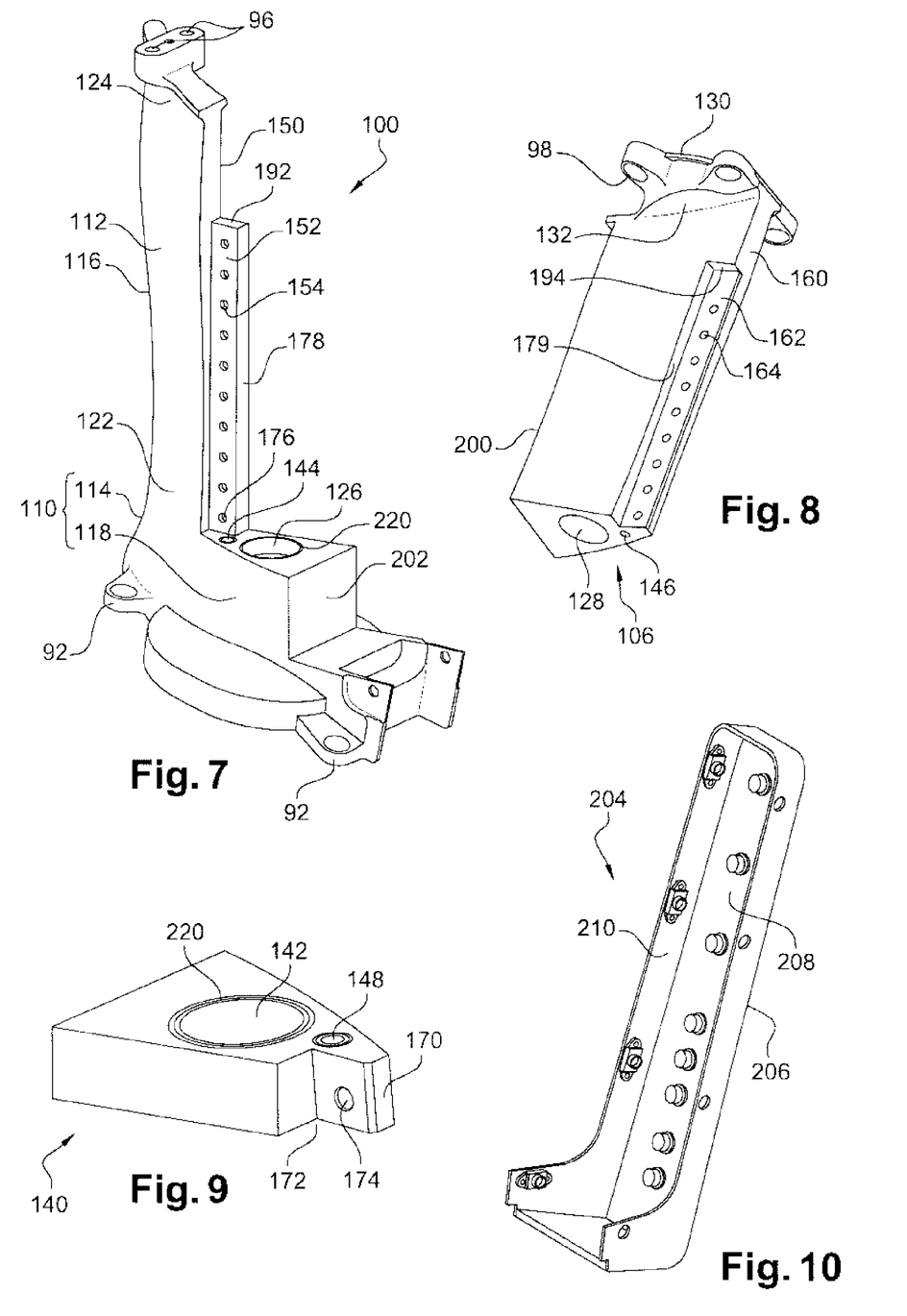
FIG. 7 is a schematic perspective view of a body of the arm in FIG. 5.
FIG. 8 is a schematic perspective view of an additional piece of the arm in FIG. 5.
FIG. 9 is a schematic perspective view of a spacer of the arm in FIG. 5.
FIG. 10 is a schematic perspective view of an interface piece of the arm in FIG. 5.

The body 100 is formed by a base 110 and an upright 112 (FIGS. 5, 6 and 7).

The base 110 comprises a first portion 114, arranged on the same side as a first lateral end 116 of the arm, and a second portion 118 arranged on the same side as a second lateral end 120 of the arm, opposite to the first lateral end 116 (FIG. 5).

In the preferred embodiment of the invention, as shown more particularly in FIG. 4, the first lateral end 116 of the arm is intended to be situated on an upstream side of the turbine engine and corresponds to a leading edge of the arm, while the second lateral end 120 of the arm is intended to be situated on a downstream side. The body 100 has overall a form splayed in the direction going from the first lateral end 116 towards the second lateral end 120.

The base 110 has fixing lugs that constitute the aforementioned first fixing means 92 (FIGS. 5 to 7).

The upright 112 has, on one side, a first longitudinal end 122 connected to the first portion 114 of the base 110, and, on an opposite side, a second longitudinal end 124 having for example fixing lugs that constitute a part 96 of the aforementioned second fixing means.

Moreover, the base 110 includes a through orifice that forms a first section 126 of the shaft housing 102 (FIG. 7).

The additional piece 106 (FIGS. 5, 6 and 8) includes a through orifice that forms a second section 128 of the shaft housing 102 and which broadens at a longitudinal end 130 of the piece, arranged on the same side as the second longitudinal end 94 of the arm, so as to form the bearing housing 104 (FIGS. 5 and 6).

By way of example, the additional piece 106 has a roughly triangular cross section and terminates at the longitudinal end 130 in a cylindrical portion of revolution 132 in which the broadened part of the through orifice that forms the bearing housing 104 is formed.

Moreover, the arm 50 comprises a spacer 140 interposed between the base 110 and the additional piece 106 (FIG. 5). This spacer 140 comprises a through orifice forming a third section 142 of the shaft housing 102 (FIG. 9).

In the example illustrated, the base 110, the additional piece 106 and the spacer 140 comprise other respective through orifices 144, 146, 148 aligned and forming a lubrication conduit (FIGS. 7 to 9).

Considering once again the body 100 of the arm 50 (FIG. 7), it should be noted that the upright 112 has a first surface 150 and a fixing plate 152 projecting beyond the first surface 150. The fixing plate 152 comprises first fixing orifices 154, which are preferably each provided with a countersink 155 (FIG. 6) or a milling for housing a corresponding screw head.

The additional piece 106 has a second surface 160, and a first recess 162 emerging in the second surface 160 (FIG. 8). The additional piece 106 further comprises second fixing orifices 164 that emerge in the first recess 162.

The spacer 140 comprises a third surface 170, a second recess 172 emerging in the third surface 170, and a third fixing orifice 174 (FIG. 9).

In addition, the fixing plate 152 comprises a fourth fixing orifice 174, and has a fourth surface 178. The first recess 162 has a bottom surface 179.

The second surface 160 of the additional piece 106 and the third surface 170 of the spacer 140 are applied to the first surface 150 of the body 100. In addition, the fixing plate 152 is arranged in the first recess 162 and in the second recess 172, so that each first fixing orifice 154 is disposed in line with a corresponding second fixing orifice 164 and so that the fourth fixing orifice 176 is disposed in line with the third fixing orifice 174 (FIGS. 5 and 6). Furthermore, the fourth surface 178 of the fixing plate 152 is applied to the bottom surface 179 of the first recess 162.

In addition, the arm 50 comprises, for each first fixing orifice 154, a first fixing member 180 (FIGS. 4 to 6) that passes conjointly through the first fixing orifice 154 and the corresponding second fixing orifice 164 so as to fix the additional piece 106 on the body 100 reversibly. The arm further comprises a second fixing member 182 (FIG. 5) that passes conjointly through the third fixing orifice 174 and the fourth fixing orifice 176 so as to fix the spacer 140 on the body 100 reversibly.

The first surface 150, the second surface 160, the fourth surface 178 and the bottom surface 179 thus constitute contact surfaces by means of which the upright 112 and the additional piece 106 are mutually in contact. These contact surfaces are, generally, conformed so as to allow a movement of the additional piece 106 towards the base 110, parallel to the axis 103 of the shaft housing, when the spacer has been removed. In the example illustrated, the surfaces 150, 160, 170, 178, 179 thus extend parallel to the axis 103 of the shaft housing 102.

As FIGS. 4 and 5 show, the first recess 162 extends beyond the fixing plate 152 in the direction D of moving away from the base 110, parallel to the axis 103 of the shaft housing 102. In addition, as shown by FIG. 4, the extent d1 of the first recess 162 beyond the fixing plate 152 in a direction parallel to the axis 103 of the shaft housing 102, and the extent d2 of the spacer 140 in this same direction, are greater than a distance of uncoupling of the bearing 76 and the primary transmission shaft 64. The "uncoupling distance" is the distance by which it is necessary to move the bearing 76 with respect to the primary transmission shaft 64 in order to obtain the uncoupling of these elements.

These preferential features make it possible to allow a sliding of the additional piece 106 along the upright 112 when the spacer 140 has been removed.

In a variant, the movement of the additional piece 106 can be carried out by moving the additional piece 106 closer to the base 110 while moving the additional piece 106 away from the upright 112.

Furthermore, the arm 50 comprises an obturator 190 (FIGS. 4 to 6) arranged in the first recess 162 alongside the fixing plate 152, so as to recover the additional piece 106 from a longitudinal end 192 of the fixing plate 152, situated on the same side as the second longitudinal end 124 of the upright 112 (FIGS. 4 and 7), as far as a longitudinal end 194 of the first recess 162, situated on this second side (FIGS. 4 and 8), and from the bottom surface 179 of the first recess 162, which is situated on the same side as the second lateral end 120 of the arm, as far as the first surface 150 (FIGS. 4 and 7). The obturator 190 thus closes off the region of the recess situated beyond the fixing plate 152 in the direction D of moving away from the base, and consequently ensures the aerodynamic continuity of the external surface of the arm 50. The obturator 190 is fixed to the additional piece 106, for example by means of a fixing screw (not visible in the figures).

Moreover, the additional piece 106 comprises a fifth surface 200 situated on the side opposite to the side of the second surface 160, and the base 110 has a sixth surface 202 situated in line with the fifth surface 200 when the additional piece 106 is assembled on the body 100. In addition, the arm 50 comprises an interface plate 204 having a seventh surface 206 applied conjointly to the fifth and sixth surfaces 200, 202 (FIGS. 4 and 6) and fixed to at least one of these surfaces 200, 202, for example by means of fixing screws (not visible in the figures). The interface plate 204 takes for example the form of a plate 208 in the form of an angle bracket provided with a stiffening rim 210 substantially orthogonal to the plate 208 (FIG. 10).

The interface plate 204 reinforces the holding of the additional piece 106 on the body 100 and furthermore offers a fixing interface for an ancillaries passage kit 88 (FIG. 4), which is for example of a conventional type.

In the turbine engine 10 of FIG. 4 including the arm 50, the secondary transmission shaft 66 extends in the shaft housing 102 formed by the first, second and third sections 126, 128 and 142, which are aligned, and the bearing 76 is housed in the bearing housing 104 provided in the additional piece 106.

Preferentially, the base 110 and the spacer 140 are provided with O-ring seals 220 disposed respectively around through orifices 126, 128, 142, 144, 146, 148 at the contacts between the base 110 and the spacer 140 and between the spacer 140 and the additional piece 106 (FIGS. 7 and 9).

The bearing 76 can advantageously be removed by means of a removal method comprising the steps consisting of:
  where applicable, removing the ancillaries passage kit 88 fixed to the interface plate 204,
  removing the interface plate 204, where necessary by unscrewing the corresponding fixing screw;
  removing the secondary transmission shaft 66 by moving it in translation along the axis 103 of the shaft housing 102, from the first end 90 of the arm 50; where necessary, this step may require the removal of the angle transfer box 80;
  removing the first and second fixing members 180, 182 and the obturator 190;
  removing the spacer 140 and causing a movement of the additional piece 106 towards the base 110 of the body 100, making it possible to access the bearing 76 in order to uncouple it from the primary transmission shaft 64;
  removing the additional piece 106 and the bearing 76.

It can then also be possible to remove the primary transmission shaft 64.

The assembly or reassembly of the arm 50 and transmission shaft 62 can be carried out by performing the same steps in the reverse order.

The invention claimed is:

1. An arm for a casing of a turbine engine, having a first longitudinal end provided with first fixing means configured to be fixed to an external casing collar, and a second longitudinal end provided with second fixing means configured to be fixed to a casing hub, the arm comprising a shaft housing emerging at the first longitudinal end of the arm in order to house a secondary turbine-engine transmission shaft, wherein:
- the arm comprises a body formed by a base and an upright,
- the base includes the first fixing means and has a first portion arranged on the same side as a first lateral end of the arm, and a second portion arranged on the same side as a second lateral end of the arm opposite to the first lateral end and including a first section of the shaft housing,
- the upright has a first longitudinal end connected to the first portion of the base, and a second longitudinal end opposite to the first longitudinal end and including a part of the second fixing means,
- the arm comprises an additional piece fixed removably to the body,
- the additional piece includes a second section of the shaft housing and delimits a bearing housing emerging in the shaft housing and intended to house a bearing,
- the arm comprises a spacer interposed between the base and the additional piece,
- the spacer includes a third section of the shaft housing, and
- the upright and the additional piece are mutually in contact by means of contact surfaces conformed so as to allow movement of the additional piece towards the base when the arm is devoid of the spacer.

2. The arm according to claim 1, wherein the contact surfaces are conformed so as to allow movement of the additional piece towards the base parallel to an axis of the shaft housing when the arm is devoid of the spacer.

3. The arm according to claim 2,
wherein:
- the contact surfaces comprise a first surface formed on the upright and a second surface formed on the additional piece and applied against the first surface,
- the upright comprises a fixing plate projecting beyond the first surface,
- the additional piece has a first recess emerging in the second surface, and in which the fixing plate is arranged,
- the first recess extends beyond the fixing plate in a direction of moving away from the base parallel to the axis of the shaft housing,
- the fixing plate comprises at least a first fixing orifice, the additional piece comprises at least a second fixing orifice,
- the arm further comprising at least a first fixing member conjointly passing through the first fixing orifice and the second fixing orifice.

4. The arm according to claim 3, further comprising an obturator arranged in the first recess alongside the fixing plate so as to close off a region of the recess situated beyond the fixing plate in the direction of moving away from the base.

5. The arm according to claim 1, wherein the bearing housing emerges in the second longitudinal end of the arm.

6. A turbine engine for an aircraft, comprising:
- a rotor shaft connecting compressor blades to turbine blades,
- a secondary flow channel,
- a casing comprising a casing hub arranged radially towards the inside with respect to the secondary flow channel, and an external casing collar arranged radially towards the outside with respect to the secondary flow channel,
- a primary transmission shaft and a secondary transmission shaft arranged end to end and extending in a direction orthogonal or inclined with respect to the rotor shaft, and
- a bearing for guiding the primary and secondary transmission shafts, and wherein:
- the casing comprises the arm according to claim 1, the first fixing means of which are fixed to the external casing collar, and the second fixing means of which are fixed to the casing hub,
- the primary transmission shaft has a radially internal end coupled to the rotor shaft, and a radially external end,
- the secondary transmission shaft has a radially internal end coupled to the radially external end of the primary transmission shaft at the bearing,
- the secondary transmission shaft is housed in the shaft housing of the arm, and
- the bearing is housed in the bearing housing of the arm.

7. The turbine engine according to claim 6,
wherein:
- the contact surfaces are conformed so as to allow movement of the additional piece towards the base parallel to an axis of the shaft housing when the arm is devoid of the spacer,
- the contact surfaces comprise a first surface formed on the upright and a second surface formed on the additional piece and applied against the first surface,
- the upright comprises a fixing plate projecting beyond the first surface,
- the additional piece has a first recess emerging in the second surface, and in which the fixing plate is arranged,
- the first recess extends beyond the fixing plate in a direction of moving away from the base parallel to the axis of the shaft housing,
- the fixing plate comprises at least a first fixing orifice, the additional piece comprises at least a second fixing orifice,
- the arm further comprises at least a first fixing member conjointly passing through the first fixing orifice and the second fixing orifice, and
- wherein an extent of the first recess beyond the fixing plate and an extent of the spacer in a direction parallel to the primary transmission shaft are greater than an uncoupling distance of the bearing and primary transmission shaft.

8. A method for removing the bearing of the turbine engine of claim 6, comprising the steps of:
- removing the secondary transmission shaft from the first longitudinal end of the arm,
- removing the spacer,
- removing the additional piece, then
- moving the additional piece towards the base of the body in a space previously occupied by the spacer, then
- uncoupling the bearing and primary transmission shaft.

9. The method according to claim 8,
wherein:
- the contact surfaces are conformed so as to allow movement of the additional piece towards the base parallel to an axis of the shaft housing when the arm is devoid of the spacer, the contact surfaces comprise a first surface formed on the upright and a second surface formed on the additional piece and applied against the first surface, the upright comprises a fixing plate projecting beyond the first surface, the additional piece has a first recess emerging in the second surface, and in which the fixing plate is arranged, the first recess extends beyond the fixing plate in a direction of moving away from the base parallel to the axis of the shaft housing, the fixing plate comprises at least a first fixing orifice, the additional piece comprises at least a second fixing orifice, the arm further comprises at least a first fixing member conjointly passing through the first fixing orifice and the second fixing orifice, and the arm further comprises an obturator arranged in the first recess alongside the fixing plate so as to close off a region of the recess situated beyond the fixing plate in the direction of moving away from the base, the method comprising a step of removing the obturator prior to the step of moving the additional piece towards the base.

10. The method according to claim 8, comprising a step of removing an interface plate previously fixed to the base of the body and to the additional piece so as to sandwich the additional piece with the upright.

* * * * *